United States Patent
Danneberg et al.

(10) Patent No.: US 11,207,740 B2
(45) Date of Patent: Dec. 28, 2021

(54) METHOD FOR PRODUCING AN INTERNAL COMBUSTION ENGINE

(71) Applicant: Bayerische Motoren Werke Aktiengesellschaft, Munich (DE)

(72) Inventors: Frank Danneberg, Ergolding (DE); Wolfram Wagener, Geisenhausen (DE); Patrick Woisetschlaeger, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 49 days.

(21) Appl. No.: 16/797,213

(22) Filed: Feb. 21, 2020

(65) Prior Publication Data

US 2020/0189010 A1 Jun. 18, 2020

Related U.S. Application Data

(63) Continuation of application No. PCT/EP-2018/070699, filed on Jul. 31, 2018.

(30) Foreign Application Priority Data

Aug. 24, 2017 (DE) .................... 10 2017 214 796.2

(51) Int. Cl.
  *F02F 1/00* (2006.01)
  *B23C 3/16* (2006.01)
  *C23C 4/01* (2016.01)

(52) U.S. Cl.
  CPC ............... *B23C 3/16* (2013.01); *C23C 4/01* (2016.01); *F02F 1/004* (2013.01); *B23C 2215/24* (2013.01); *F02F 2200/00* (2013.01)

(58) Field of Classification Search
  USPC ............... 427/455; 29/557, 558, 888.06; 123/193.2, 270, 272
  See application file for complete search history.

(56) References Cited

U.S. PATENT DOCUMENTS 2,085,976 A * 7/1937 Heintz ............... F02F 1/08
  92/153
3,961,104 A * 6/1976 Tanner ............... F16C 33/04
  427/198

(Continued)

FOREIGN PATENT DOCUMENTS

| CN | 105492647 A | 9/2015 |
| CN | 105492647 A | 4/2016 |

(Continued)

OTHER PUBLICATIONS

English translation of Chinese Office Action issued in Chinese Application No. 201880038912.4 dated Jan. 13, 2021 (eight (8) pages).

(Continued)

*Primary Examiner* — George C Jin
*Assistant Examiner* — Teuta B Holbrook
(74) *Attorney, Agent, or Firm* — Crowell & Moring LLP

(57) ABSTRACT

A method for producing an internal combustion engine, includes the steps of providing a cylinder comprising a cylinder wall, wherein a surface of the cylinder wall has a structure which is designed and formed such that it can be penetrated by a coating; generating at least one barrier region by way of at least regional machining of the structure such that the coating cannot penetrate into the structure; and applying a coating to the cylinder wall, which coating does not penetrate into the structure in the at least one barrier region.

15 Claims, 2 Drawing Sheets

(56) References Cited

U.S. PATENT DOCUMENTS

| | | | | |
|---|---|---|---|---|
| 5,271,967 | A * | 12/1993 | Kramer | C23C 4/12 |
| | | | | 29/888.061 |
| 5,363,821 | A * | 11/1994 | Rao | C23C 4/04 |
| | | | | 123/193.2 |
| 5,380,564 | A * | 1/1995 | VanKuiken, Jr. | C23C 4/02 |
| | | | | 427/328 |
| 5,549,086 | A * | 8/1996 | Ozawa | F02F 1/20 |
| | | | | 123/193.2 |
| 8,651,083 | B2 * | 2/2014 | Izawa | C23C 4/06 |
| | | | | 123/193.2 |
| 10,408,159 | B2 * | 9/2019 | Amano | F02F 7/0085 |
| 2008/0245227 | A1 * | 10/2008 | Iizumi | B23B 27/06 |
| | | | | 92/169.1 |
| 2009/0175571 | A1 | 7/2009 | Boehm et al. | |
| 2013/0028140 | A1 | 1/2013 | Hui et al. | |
| 2014/0345453 | A1 * | 11/2014 | Oh | F02F 1/004 |
| | | | | 92/169.1 |
| 2015/0147165 | A1 * | 5/2015 | Bunker | F28F 19/06 |
| | | | | 415/175 |
| 2015/0292432 | A1 | 10/2015 | Stephenson et al. | |
| 2016/0193626 | A1 | 7/2016 | Wagener et al. | |
| 2016/0208370 | A1 * | 7/2016 | Bauer | F16J 10/04 |
| 2016/0215773 | A1 | 7/2016 | Johansson | |
| 2017/0107933 | A1 * | 4/2017 | Favaron | F02F 1/004 |
| 2017/0362691 | A1 * | 12/2017 | Li | C23C 4/02 |
| 2018/0066349 | A1 * | 3/2018 | Klumpp | C23C 4/134 |
| 2018/0141136 | A1 * | 5/2018 | Agapiou | B23C 3/34 |
| 2018/0283309 | A1 * | 10/2018 | Kamat | B22D 19/0009 |
| 2019/0257263 | A1 * | 8/2019 | Weber | C23C 26/00 |

FOREIGN PATENT DOCUMENTS

| | | | |
|---|---|---|---|
| DE | 10 2006 004 769 A1 | | 8/2007 |
| DE | 10 2008 024 313 A1 | | 12/2009 |
| DE | 10 2010 014 689 A1 | | 10/2011 |
| DE | 10 2010 053 327 A1 | | 6/2012 |
| DE | 10 2013 014 844 A1 | | 3/2015 |
| DE | 10 2015 206 513 A1 | | 10/2015 |
| JP | 2009275551 A | * | 11/2009 |
| JP | 2015-140702 A | | 8/2015 |
| JP | 2015140702 A | * | 8/2015 |
| WO | WO 2015/019145 A2 | | 2/2015 |

OTHER PUBLICATIONS

International Search Report (PCT/ISA/210) issued in PCT Application No. PCT/EP2018/070699 dated Oct. 18, 2018 with English translation (six (6) pages).

German-language Written Opinion (PCT/ISA/237) issued in PCT Application No. PCT/EP2018/070699 dated Oct. 18, 2018 (five (5) pages).

German-language Search Report issued in counterpart German Application No. 102017214796.2 dated Apr. 13, 2018 with partial English translation (11 pages).

* cited by examiner

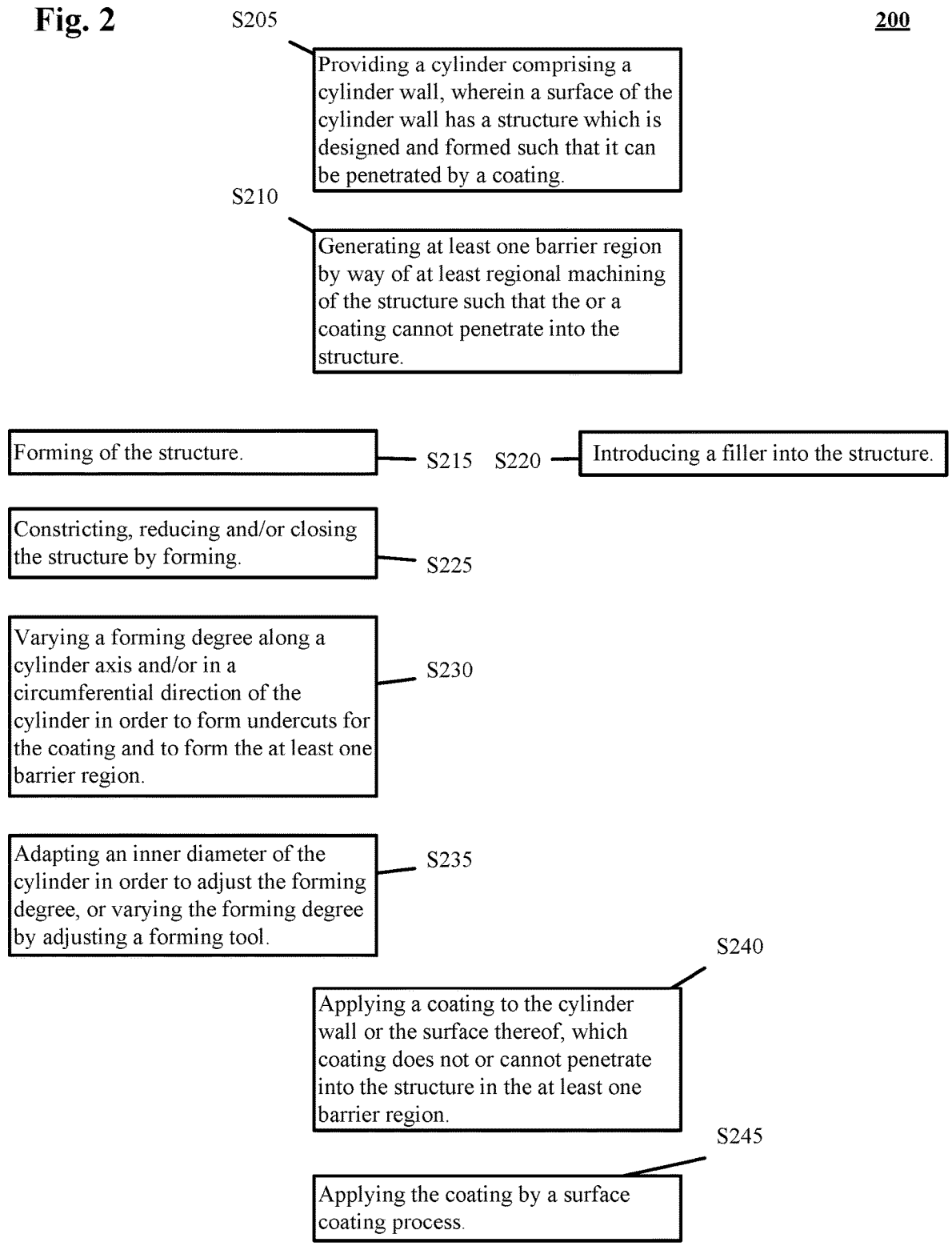

METHOD FOR PRODUCING AN INTERNAL COMBUSTION ENGINE

CROSS REFERENCE TO RELATED APPLICATIONS

This application is a continuation of PCT International Application No. PCT/EP2018/070699, filed Jul. 31, 2018, which claims priority under 35 U.S.C. § 119 from German Patent Application No. 10 2017 214 796.2, filed Aug. 24, 2017, the entire disclosures of which are herein expressly incorporated by reference.

BACKGROUND AND SUMMARY OF THE INVENTION

The present invention concerns a method for producing an internal combustion engine, a cylinder of an internal combustion machine, and a crankcase of the internal combustion machine.

Pistons of reciprocating piston machines normally do not run directly in the crankcase. In the automotive sector in particular, it is known to provide a crankcase, without liners, with a coating to reduce wear and friction. This coating is applied for example by thermal spraying. A cylinder wall coated in this way has a constant heat transfer coefficient along the entire piston stroke. This constant heat transfer coefficient may be disadvantageous for the lubricant film acting between the piston rings and the cylinder wall, since its viscosity is primarily dependent on temperature. The temperature is highest in the region of the top dead center of the piston, while it is lowest or at least lower at the bottom dead center. Consequently, the lubricant is exposed to very great temperature fluctuations, which increases the quality requirements. In particular, a $CO_2$-saving potential is wasted since the lubricant film viscosity does not meet the needs.

It is therefore an object of the present invention to provide a method for producing an internal combustion engine, a cylinder of an internal combustion machine and a crankcase, which eliminate the above-mentioned disadvantages and at the same time can be implemented simply and cheaply.

This object is achieved by a method for producing an internal combustion engine, by a cylinder of an internal combustion machine, and by a crankcase, in accordance with the claimed invention.

According to the invention, a method for producing an internal combustion engine comprises the steps:

providing a cylinder comprising a cylinder wall, wherein a surface of the cylinder wall has a structure which is designed and formed such that it can be penetrated by a coating;

generating at least one barrier region by way of at least regional machining of the structure such that the or a coating cannot penetrate into the structure;

applying a coating to the cylinder wall or the surface thereof, which coating does not or cannot penetrate into the structure in the at least one barrier region.

The above-mentioned structure is in particular the result of a so-called activation of the cylinder wall, which is designed and intended to improve the adhesion of a coating. Preferably, the structure is applied mechanically such as by separation, cutting, sawing, roughening, or generally by forming a structure which allows and supports a macro-form fit with the later coating. As well as said processes, for activation for example it is also known to water-blast the cylinder wall, which may also be used in the present case in order to form a suitable structure. Finally, the structure forms recesses or depressions in the cylinder wall, into which the later coating can penetrate. According to preferred embodiments, these recesses have depths ranging from 0.05 to 0.3 mm. According to the invention, by machining the structure at least in regions or by creating the barrier region, the structure is changed such that the coating cannot penetrate into the structure, in other words into the recesses, depressions, etc. The structure is not destroyed but merely changed so as to prevent penetration by the coating. As a result, after application of the coating in the barrier region, "holes", voids, cavities or air inclusions are created which influence the heat transfer coefficient of the cylinder wall in this portion. Depending on the embodiment of the method, in targeted fashion regions are formed in the cylinder wall which act e.g. as insulators. The modified heat transfer coefficient may advantageously be used to change the viscosity of the lubricant film in targeted fashion. Since the lubricant film becomes less viscous as the temperature rises, for example the friction between the piston or its piston rings and the cylinder wall can be deliberately reduced, or the loading capacity of the lubricant film can be adjusted.

According to one embodiment, the structure comprises grooves, webs, scoring, fluting and/or recesses, etc. According to one embodiment, the structure is configured so as to be constant or identical over the entire cylinder height. This is not, however, absolutely necessary. A geometry of the structure may also be configured differently, or the cylinder wall need not be provided with a structure over its full surface.

According to one embodiment, the regional machining takes place in particular by forming, in particular plastic deformation, of the structure. Advantageously, targeted forming of the (mechanically) roughened cylinder wall or a structure, such as for example the webs, creates cavities which cannot be filled by means of the coating process.

According to one embodiment, the method comprises the step of constricting, reducing and/or closing the structure by forming, in particular geometrically modifying, the grooves, such as reducing the grooves, at least locally.

According to one embodiment, for example the grooves, in particular the grooves as such, are constricted in the barrier region by the machining or forming such that the coating cannot penetrate. According to another embodiment, only the inlets to the grooves are constricted so that the coating cannot penetrate. Finally, the actual implementation depends on the geometry of the structure and on the parameters of the coating process. It is decisive that the method is implemented such that, after coating, in the barrier region, cavities or similar are formed between the coating and the cylinder wall or in this.

Alternatively and/or additionally, the regional machining takes place by introduction of a filler into the structure. In this embodiment, penetration of the coating into the structure is prevented in that the structure is already filled with the filler. This may be a material which acts as an insulator, i.e. reduces the heat transfer coefficient of the cylinder wall. According to one embodiment, the filler is a ceramic, in particular an insulating ceramic such as AL2O3, according to one embodiment for example in paste form. Alternatively, a material may also be used in targeted fashion to increase the heat transfer coefficient of the cylinder wall, whereby a better heat dissipation from the combustion chamber can be achieved. The filling or insulating substance may, according to one embodiment, be applied to or sprayed into the previously made grooves (i.e. after scoring or before rolling, i.e. production of the undercuts), and then remains in the grooves after rolling. Alternatively, the filling or insulating substance is introduced into the "finished" structure after rolling, for example in particular blown in under pressure with a high pressure jet, for example with a pressure of >1 bar.

According to one example, the method comprises the step of varying a forming degree along a cylinder axis or vertical axis and/or in a circumferential direction of the cylinder, in order to form undercuts for the coating and to form the at least one barrier region.

Advantageously, forming takes place over the entire cylinder length, wherein the barrier region or the at least one barrier region can be produced for example by a targeted, greater regional forming of the structure. Also, forming takes place such that the undercuts are formed. In particular, for example, webs of the structure are deformed such that the undercuts are formed (=rolling) which enable interlocking to the later coating, promoting its adhesion or improving the macro-form fit. A variation in the circumferential direction means for example that a different heat transfer coefficient can be set on the inlet side from that on the outlet side.

Suitably, the method comprises the steps of adapting an inner diameter of the cylinder in order to adjust the forming degree, or varying the forming degree by adjusting a forming tool.

The forming tool is for example a rolling tool which has circumferentially arranged, rotatable rollers which are designed for forming or deforming the cylinder wall. By adjusting the forming tool, i.e. positioning this relative to a central axis of the cylinder, the forming degree can be varied or adapted, namely such that the structure along the cylinder axis is deformed so far that the later coating can no longer penetrate, or that "only" undercuts are formed. "Adapting the inner diameter" means that the cylinder does not have a constant inner diameter or a circular cross-section for example along its cylinder axis (or circumference), but that this varies. As a result, the regions of the cylinder wall in which the inner diameter is smaller are deformed more greatly when passing through the forming tool, wherein here again barrier regions may be formed etc.

According to a preferred embodiment, the method comprises the step of coating by a surface coating process, in particular thermal spraying. Wire arc spraying or plasma spraying are particularly preferred here.

The invention is also directed at a cylinder for an internal combustion machine comprising a cylinder wall, wherein a coating is arranged or provided on the cylinder wall, and wherein the coating together with the cylinder wall forms cavities, at least in portions, or at least one cavity.

For the cylinder, the advantages mentioned in connection with the method according to the invention apply accordingly and similarly, and vice versa.

For example, a targeted, greater deforming of the cylinder wall may lead to formation of cavities or voids which cannot be filled on coating by means of a (thermal) coating process. The result is air inclusions which act as insulators, which in turn change the heat transmission. A different heat transmission allows a change in the viscosity of the lubricant film. With rising temperature, the lubricant film becomes less viscous, whereby the internal friction can be reduced. As a result, the piston ring generates lower friction losses in the region in which cavities are formed.

According to one embodiment, a plurality of cavities is dimensioned and/or distributed such that a heat transfer coefficient of the cylinder wall differs at least in regions. According to one embodiment, the heat transfer coefficient is formed differently along the cylinder wall, i.e. in the axial direction, or also in the circumferential direction. This may mean for example that at the reversal points of the piston, e.g. at bottom dead center, a different heat transfer coefficient is formed than at the top dead center or between the reversal points, for example a higher coefficient, in order to generate lower temperatures in the cylinder wall which cause a higher viscosity of the lubricant film. In these regions, an oil film which can bear high loads can be generated. Between the reversal points, i.e. where the piston reaches its highest speed, the viscosity may advantageously be reduced in targeted fashion in order to create less hydrodynamic friction. In the region of the reversal points, because of the lower piston speed, the oil film must have maximum loading capacity. Due to the low speed, almost no floating of the piston ring occurs, and the majority of the friction results from the solid body friction (piston ring/cylinder running face). In the region between the reversal points, the piston speed is high. As a result, the piston ring floats on the oil film and hydrodynamic friction exists. The shear forces between the piston ring and cylinder running face in the fluid are decisive for the friction losses. Therefore, the approach in the present case comprises in particular reducing the viscosity in this region and thus reducing the shear forces or the resulting hydrodynamic friction. In particular in the region of top dead center, for example on the outlet side, a different heat transfer coefficient may also be set than on the inlet side, for example a higher coefficient on the outlet side, in order there to increase the heat dissipation and minimize temperature peaks in the cylinder wall or also in the direction of the cylinder head.

It should be stated that the cavities need not necessarily be "hollow", but may be completely filled with a material or a filler, which in some cases may also not act as an insulator but be designed to increase the heat transport.

According to one embodiment, the cylinder has a reduced heat transfer coefficient between the dead centers, in particular a heat transfer coefficient which is reduced in comparison with the piston reversal points or dead centers. In particular, in this way, in a middle region or in a region of maximal piston speed, the viscosity of the oil film may be set or provided to be as low as possible. The advantages have already been described.

According to one embodiment, the shape, number and/or size of the cavities differ in the circumferential direction of the cylinder. In principle, the position, distribution or also size of the cavities are dependent on the geometry of the structure. According to a preferred embodiment, the structure is formed by a plurality of grooves/webs running in parallel or in a helical form, for example created by mechanical separation such as e.g. sawing, for example by means of one or more saw blades. As a result, the cavities have a groove-like structure.

According to one embodiment, the cavities are produced by a method according to the invention.

The invention furthermore concerns a crankcase comprising at least one cylinder according to the invention. The same advantages and features mentioned in connection with the method or cylinder also apply accordingly and similarly to the crankcase, and vice versa and between each other.

Other objects, advantages and novel features of the present invention will become apparent from the following detailed description of one or more preferred embodiments when considered in conjunction with the accompanying drawing.

BRIEF DESCRIPTION OF THE DRAWING

FIG. 2 is a block diagram of a process of producing an internal combustion engine.

DETAILED DESCRIPTION OF THE DRAWING

Figure 1:
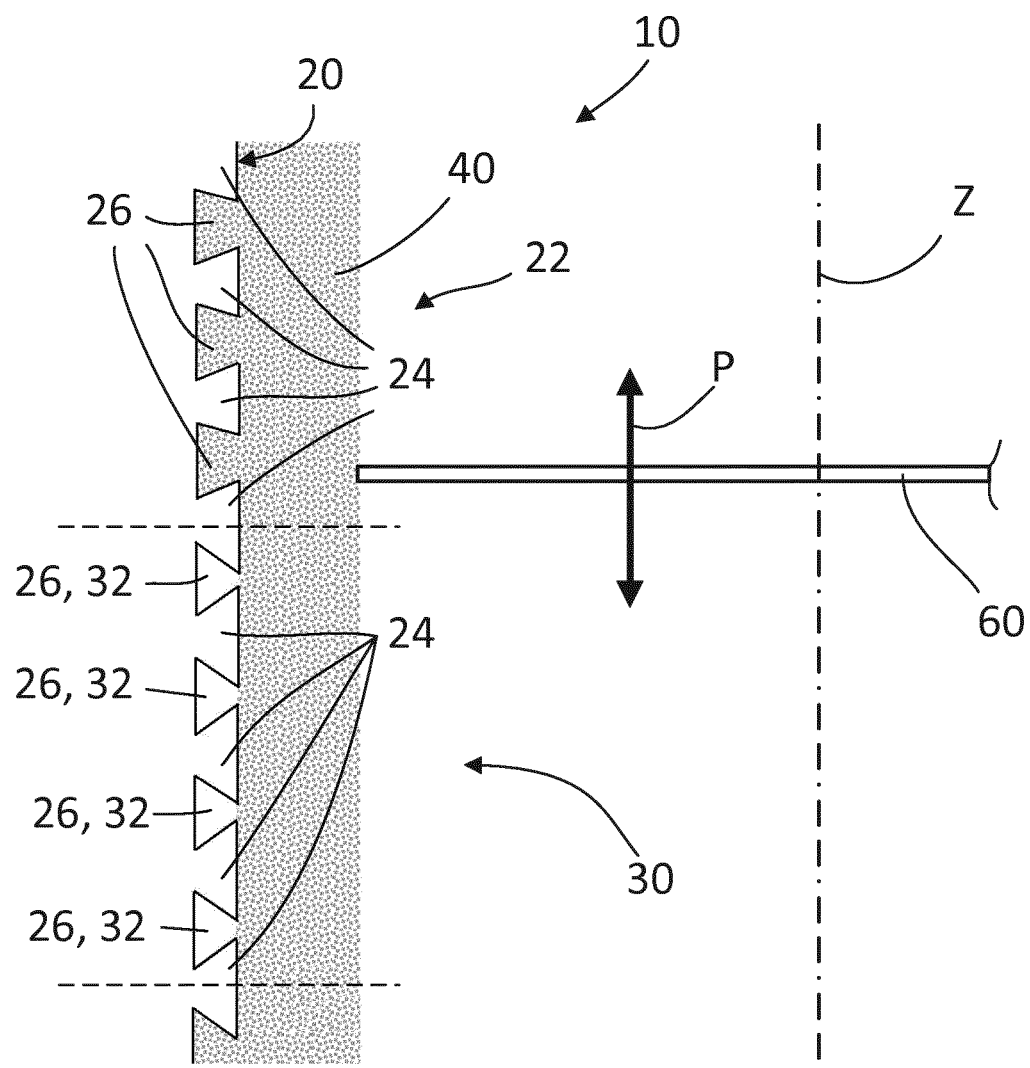
FIG. 1 is a diagrammatic, sectional view of a cylinder or a cylinder wall with a barrier region.

FIG. 1 shows a cylinder or a cylinder wall 10 which extends along a cylinder axis Z or a central axis of the cylinder. A coating 40 is applied to a surface 20 of the cylinder wall 10, for example by way of a thermal coating process such as wire arc spraying. In order to improve its adhesion, the surface 20 is "activated", i.e. provided with a structure 22 which, in the embodiment shown here, comprises grooves 26 or webs 24. It is clearly evident that a cross-section of the grooves 26 is not square or rectangular, but that the webs 24 are deformed so as to form undercuts. These are so strongly pronounced inside the region delimited by the dotted lines that the coating 40 can no longer penetrate into the grooves 26. As a result, in this portion described as the barrier region 30, cavities 32 are formed which act for example as insulators. Reference sign 60 designates a piston ring 60 which, as indicated by the double arrow P, moves up and down along the cylinder axis Z. A lubricant film (not shown further here) is present between the piston ring 60 and the coating 40. Due to a modified heat transfer coefficient in the barrier region 30, wherein the cavities 32 act as insulators in the embodiment shown here, the heat transmission can be reduced, which leads to the cylinder wall 10 in this portion being warmer, whereby the lubricant film in this region is less viscous. As a result, friction losses may be reduced. According to one embodiment, the barrier region 30 is provided for example at the point at which the piston reaches its greatest speed. Depending on the embodiment however, a plurality of such barrier regions may be provided over or along the cylinder axis Z. In some cases, a crankcase comprising several cylinders may also have a different design, i.e. not all cylinders need have such a barrier region, or the barrier regions may be formed at different locations in the cylinder or cylinders, etc.

FIG. 2 is a method of producing an internal combustion engine 200 comprising (S205) providing a cylinder comprising a cylinder wall, wherein a surface of the cylinder wall has a structure which is designed and formed such that it can be penetrated by a coating; (S210) generating at least one barrier region by way of at least one regional machining of the structure such that the or a coating cannot penetrate into the structure; alternatively or in addition, the regional machining takes place by (S220) introducing a filler into the structure; and (S240) applying a coating to the cylinder wall or the surface thereof, which coating does not or cannot penetrate into the structure in the at least one barrier region. The method 200 further comprises (S215) forming a structure. The method 200 further comprises (S225) constricting, reducing and/or closing the structure by forming, in particular geometrically modifying, the grooves, such as reducing the grooves, at least locally. The method 200 further comprises (S230) varying a forming degree along a cylinder axis or vertical axis and/or in a circumferential direction of the cylinder, in order to form undercuts for the coating and to form the at least one barrier region. The method 200 further comprises (S235) adapting an inner diameter of the cylinder in order to adjust the forming degree, or varying the forming degree by adjusting a forming tool. The method 200 further comprises (S245) coating by a surface coating process, in particular, thermal spraying. Wire arc spraying or plasma spraying are particularly preferred here.

LIST OF REFERENCE SIGNS

10 Cylinder wall
20 Surface
22 Structure
24 Web
26 Groove
30 Barrier region
32 Cavity
40 Coating
60 Piston ring
P Double arrow
Z Cylinder axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing an internal combustion engine, comprising:
   providing a cylinder comprising a cylinder wall, wherein a surface of the cylinder wall has a structure which is designed and formed so as to be penetrable by a coating;
   generating at least one barrier region by way of at least regional machining of the structure such that the coating cannot penetrate into the structure in the at least one barrier region;
   applying the coating to the cylinder wall, which the coating does not penetrate into the structure in the at least one barrier region.

2. The method according to claim 1, wherein the structure comprises grooves, scoring, fluting and/or recesses.

3. The method according to claim 1, wherein the regional machining takes place by forming of the structure.

4. The method according to claim 3, further comprising: constricting, reducing and/or closing the structure by forming.

5. The method according to claim 3, further comprising:
   varying a forming degree along a cylinder axis and/or in a circumferential direction of the cylinder in order to form undercuts for the coating and to form the at least one barrier region.

6. The method according to claim 5, further comprising:
   adapting an inner diameter of the cylinder in order to adjust the forming degree, or varying the forming degree by adjusting a forming tool.

7. The method according to claim 1, wherein the regional machining takes place by introduction of a filler into the structure.

8. The method according to claim 1, further comprising: applying the coating by a surface coating process.

9. The method according to claim 8, wherein the surface coating process is thermal spraying.

10. A cylinder for an internal combustion machine, comprising:
    a cylinder wall;
    a coating provided on the cylinder wall, wherein
    the coating together with the cylinder wall form at least one cavity disposed between the coating and the cylinder wall;
    the cavities are produced by:
    providing a cylinder comprising the cylinder wall, wherein
    a surface of the cylinder wall has a structure which is penetrable by the coating;

generating at least one barrier region by way of at least regional machining of the structure such that the coating cannot penetrate into the structure in the at least one barrier region; and applying the coating to the cylinder wall, which coating does not penetrate into the structure in the at least one barrier region.

11. The cylinder according to claim 10, wherein a plurality of cavities is dimensioned and/or distributed such that a heat transfer coefficient of the cylinder wall differs at least in regions.

12. The cylinder according to claim 11, wherein the cylinder has a reduced heat transfer coefficient between piston reversal points.

13. The cylinder according to claim 11, wherein a shape, number and/or size of the cavities differ in the circumferential direction of the cylinder.

14. A crankcase comprising at least one cylinder according to claim 10.

15. A method for producing an internal combustion engine, comprising:

providing a cylinder comprising a cylinder wall, wherein a surface of the cylinder wall has a structure which is penetrable by a coating;

generating at least one barrier region by way of at least regional machining of the structure such that the coating cannot penetrate into the structure in the at least one barrier region; and applying the coating to the at least one barrier region, wherein the coating does not penetrate into the structure in the at least one barrier region.

* * * * *